Feb. 11, 1936. C. FIELD 2,030,060
HEAT EXCHANGE APPARATUS
Filed Dec. 9, 1931 3 Sheets-Sheet 3
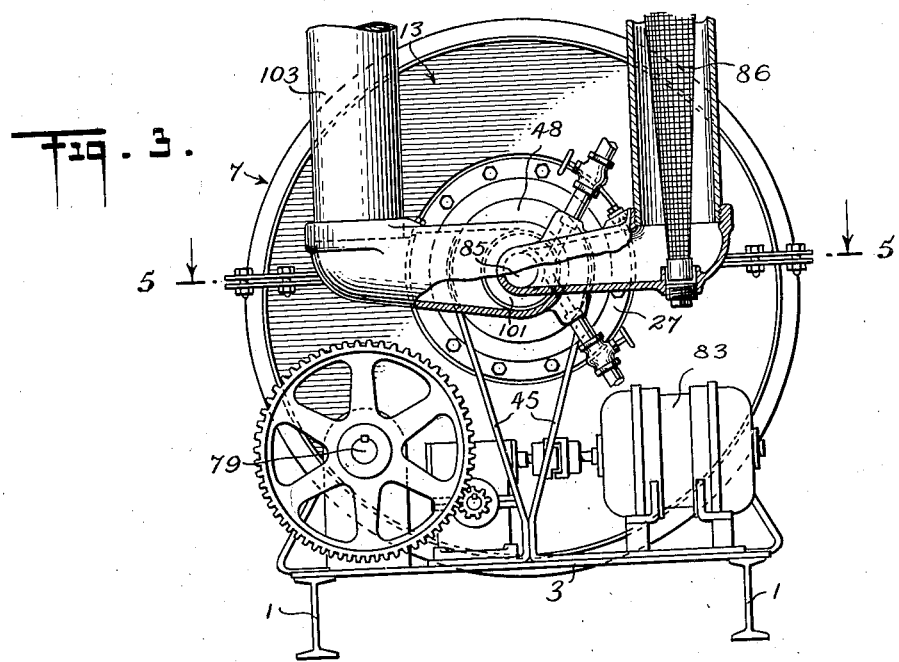
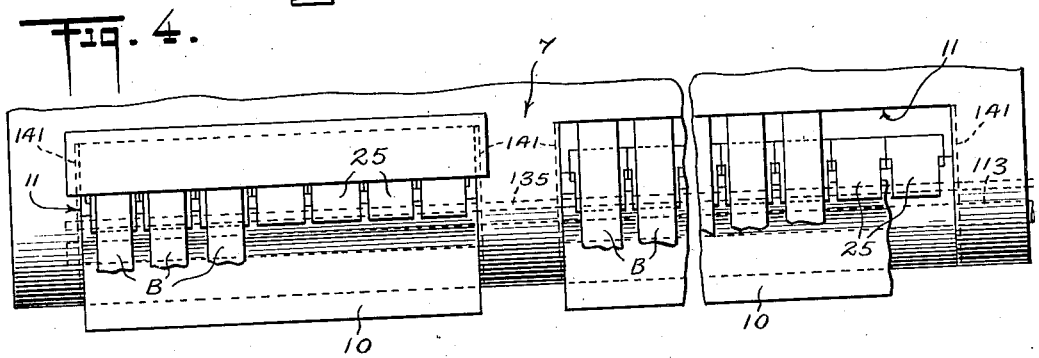
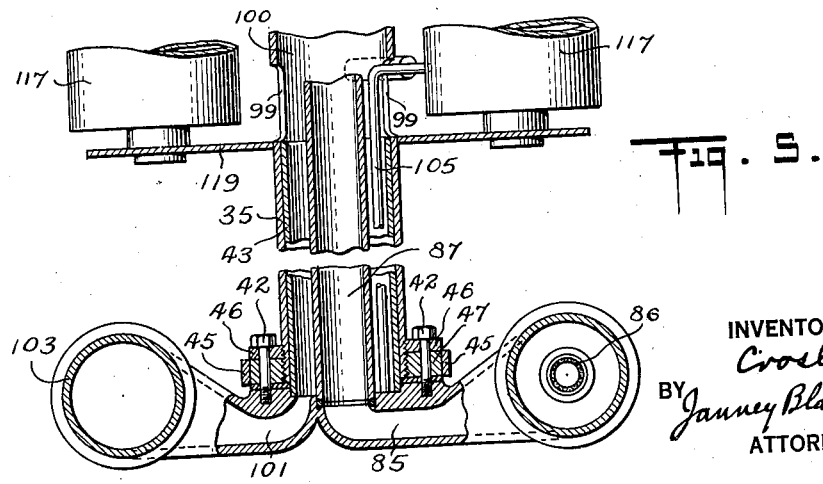
INVENTOR
Crosby Field
BY Janney Blair & Curtis
ATTORNEYS Patented Feb. 11, 1936

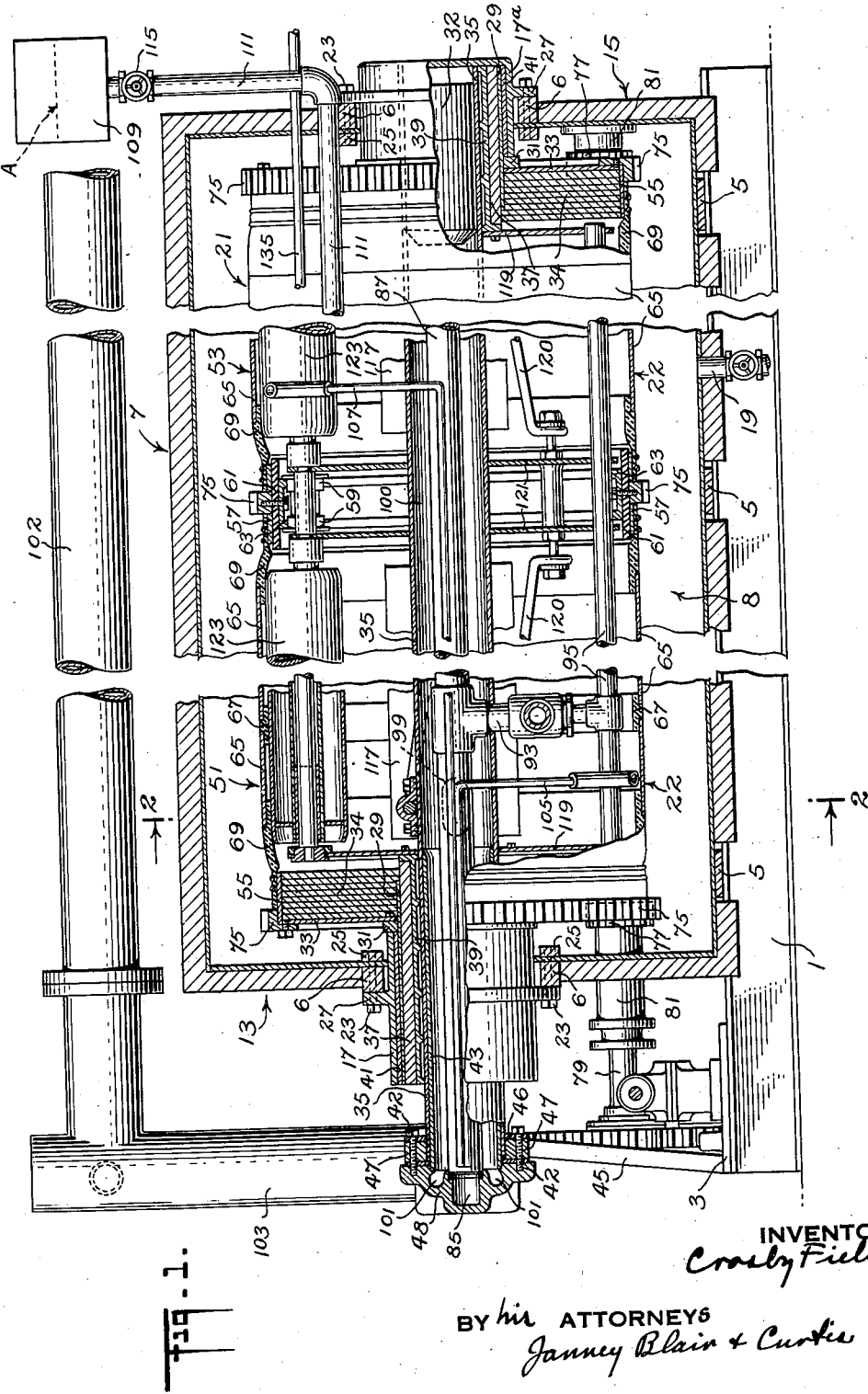

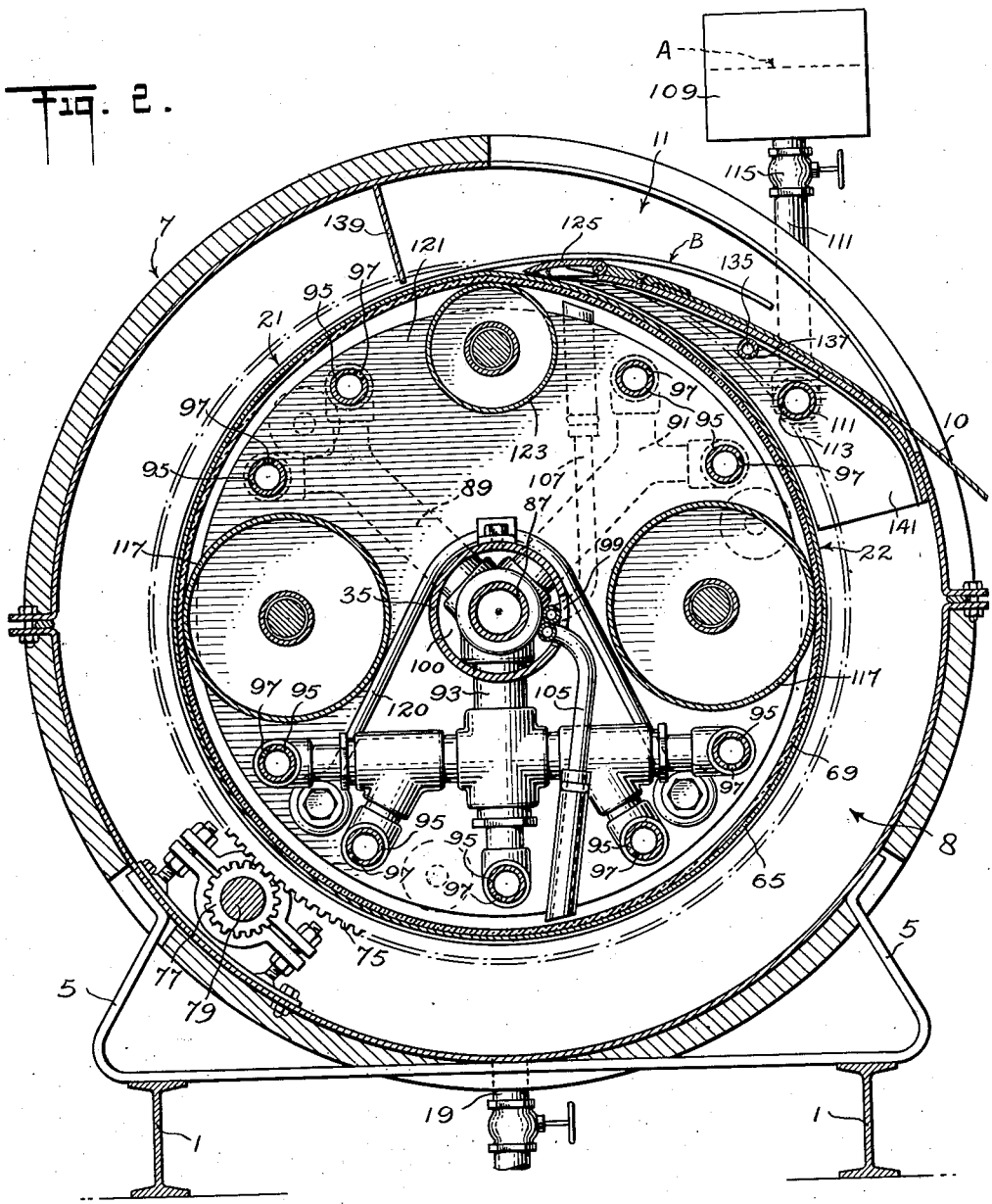

2,030,060

UNITED STATES PATENT OFFICE 2,030,060

HEAT EXCHANGE APPARATUS

Crosby Field, Brooklyn, N. Y., assignor to Flakice Corporation, Wilmington, Del., a corporation of Delaware Application December 9, 1931, Serial No. 579,842

6 Claims. (Cl. 62—106)

This invention relates to heat exchange, and with regard to certain more specific features to the method and apparatus for effecting relatively rapid heat exchange and to the products resulting therefrom.

Among the several objects of the invention may be noted the provision of an improved method for effecting a substantially instantaneous cooling and freezing of a liquid solution; the provision of a method of the class described which is more particularly suitable for commercial operation.

Another object of the invention is to provide improved apparatus of a type which will be particularly suitable for exacting commercial operative requirements in carrying out my methods.

Other objects will be in part obvious, and in part pointed out hereinafter.

The invention accordingly consists in the features of construction, combinations of elements, arrangements of parts, and steps of procedure which are exemplified in the structure, and method hereinafter described and the scope of the application of which are defined in the subjoined claims.

In the accompanying drawings, in which is shown one of the various possible embodiments of this invention, Figure 1 is a side elevation of an apparatus embodying my invention, but showing certain parts broken away for purposes of clarity;

Figure 2 is a vertical section taken on the line 2—2 of Figure 1;

Figure 3 is a reduced front elevation of the apparatus of Figure 1, and also showing certain parts broken away;

Figure 4 is a partial top plan view of the apparatus of Figure 1, and showing the manner in which strips of frozen product are peeled off from a freezing surface; and Figure 5 is a horizontal detail section taken on line 5—5 of Figure 3.

Corresponding reference characters indicate corresponding parts throughout the several views of the drawings.

Referring generally to Figures 1 and 2 there is shown an apparatus which comprises in general, a thin flexible cylinder 21 journaled for rotation, and a spray system for spraying a liquid A on the outer surface of the cylinder. The inner surface of the cylinder is exposed to a refrigerant having a relatively low temperature whereby the outer surface is kept at substantially the same low temperature. In this way the liquid which is sprayed onto the exterior surface of the cylinder is rapidly cooled to a point below its freezing point. The thin wall of the cylinder is deflected by suitable mechanism at a predetermined point and this causes the liquid which is frozen onto the exterior surface to break and/or peel off at the point of deflection.

In a freezing mechanism of this nature it is desirable, among other things, that it should be efficient from a heat transfer standpoint, and that it should be relatively inexpensive to operate. Furthermore, it is desirable in some instances to freeze a solution which if cooled relatively slowly to and below its freezing point would separate out the solute whereby a non-homogeneous frozen mass would ultimately result. The apparatus of the present invention is adapted to cool a liquid film from a relatively high temperature to a relatively low temperature substantially instantaneously, whereby any separation of a solute from a solvent is substantially prevented.

One embodiment of such an apparatus is shown in the drawings, and a description of the apparatus is as follows:

Supporting foundation

Referring to Figures 1, 2 and 3 there is shown a pair of I-beams 1 connected by a foundation plate 3 which beams and foundation plate support the entire mechanism.

Extending from the beams 1, are brackets 5 which support an insulated housing 7. The insulated housing is formed in two sections, a bottom and a top section, to facilitate assembly and disassembly of the machine. The insulation of the insulated housing 7 may comprise any insulation material suitable for such a purpose. The lower portion of the insulated housing 7 is made sufficiently strong to bear the weight of the top of the housing, and end sections 13 and 15 of the housing are sufficiently strong to bear a portion of the weight of a flexible rotatable cylinder 21 to be described hereinafter.

As shown in Figures 2 and 4, the upper section of the housing 7 is provided at the top and intermediate its ends, with longitudinal openings 11 to permit the peeled or cracked frozen solid B to pass out of the insulated housing 7 on to a chute 10 for delivery to a storage bin or receptacle (not shown).

The end section 13 supports a bearing or bored hub 17, to be described hereinafter. A manually controlled drain 19 is provided at the bottom of the lower section of the insulated housing 7 to facilitate in the removal of any surplus of liquid A which may accumulate in the bottom of the insulated housing.

Freezing cylinder assembly

As shown in Figures 1 and 2 a freezing cylinder 21 is rotatably mounted within the housing 7. A description of the left mounting of the cylinder is as follows:

The end wall 13 of the housing is provided with a central opening for receiving a bored hub 17 which is secured to the end wall 13 by bolts 23 and nuts 25 which pass through a flange 27 formed around the hub 17. Interposed between the wall 13 and the flange 27 are ring plates 6 which serve as an adjusting medium for adjusting the relative position of the hub 17 and the wall 13.

The hub or bearing 17 forms a bearing for a hollow stub shaft 29 to which a ring 31 is brazed or welded on the inner end of the stub shaft. Bolted to the ring 31 is a disk shaped head 33 which forms the supporting medium for one end of the cylinder 21. It is thus seen that the stub shaft 29 and the disk shaped head 33 fastened thereto are rotatably mounted with respect to the bearing or hub 17. It is desirable to provide a babbitt 41 to assist in the mechanical efficiency of the bearing 17.

Concentric with the bearing or hub 17 and passing therethrough is a hollow shaft 35 which serves to conduct a refrigerating medium into and out of the cylinder 21. Inasmuch as the refrigerant has a relatively low temperature, it is desirable, from a lubricating standpoint, to protect the bearing 17 and the stub shaft 29 from the low temperature of the refrigerant. In the present invention this protection is accomplished as follows:

A bushing 37, preferably of impregnated wood, is provided adjacent to and concentric with the stub shaft 29. The interior surface of the bushing 37 is next to a journal 39 which is fitted closely and is secured to the shaft 35.

It is to be noted that the insulation bushing 37 and the journal 39 do not rotate with the stub shaft 29 as the cylinder 21 is rotated. Additional insulation is provided on the interior of the shaft 35, at the area of the bearing, in the form of a sleeve of insulating material 43. In this way a substantial temperature rise is effected between the interior of the shaft 35 and the bearing 17, and lubricating difficulties are thus overcome.

It is to be noted that inasmuch as there is no liquid pressure within the housing 7, it is not necessary to provide packing or the like between the various bearings, journals and bushings to make the jointure between the shaft 35, the stub shaft 29 and the bearing 17 liquid-proof. This simplification in the construction of the machine has decided advantages among which are reduction in the cost of manufacture and reduction in the cost of repair and the like.

The hollow shaft 35 extends through the entire cylinder 21, and is secured at the left-hand side against rotation, as shown in Figures 1 and 3, by suitable torque arms 45 which are bolted to the foundation plate 3 and also to a flange ring 47 suitably secured to the shaft 35. The torque arms 45 also support the shaft 35, in addition to the support afforded by the end walls 13 and 15 of the housing 7.

The flange ring 47 is threaded onto the end of the shaft 35, and a locking ring 46 is provided to lock the ring 47 in a predetermined position. A head 48 (Figure 5) having inlet and outlet openings 85 and 101 respectively is bolted to the flange ring 47 by bolts 42.

The right-hand end of the cylinder 21 is supported by an end plate 33 in substantially the same way as the left-hand side, except for the fact that the end of the shaft 35 is sealed by a suitable plug 32 which also provides insulation for the bearing 17a. Thus in general the right-hand support is similar to the left-hand support except for the fact that the right-hand end is sealed from passage of refrigerant therepast. It is to be noted, however, that should it be desirable to provide the right-hand support for passage of the refrigerant, it can be made similarly to the left-hand support.

In this way the two disk shaped head plates 33 support the cylinder 21, and are in turn supported by the right and left hand supports 15 and 13 hereinbefore described.

Construction and operation of cylinder 21

As hereinbefore pointed out it is desirable that the cylinder 21 be flexible to the degree that it may be deflected at a given point during its rotation whereby liquid frozen on the surface of the cylinder may be peeled from the cylinder surface. It has also been found desirable that the frozen substance thus formed on the cylinder surface and peeled therefrom will be taken off in strips rather than in a solid sheet extending across the width of the cylinder. This is advantageous for many reasons among which are the packing and handling simplications effected by taking the product off in the strip form rather than in a sheet form.

A description of a cylinder 21 which is adapted to effect the desired results is as follows:

Referring to Figure 1, the cylinder 21 is made up in two sections 51 and 53 which are suitably secured to and supported by end rings 55 secured to the heads 33, and by a center ring 57, which center ring rotates on rollers 59 which are supported by the shaft 35 as will be hereinafter described. The inner surface of the center ring 57 is insulated with a rubber strip 61, and bearing against the strip 61 is a track 63 which rides on the rollers 59. The track 63 and strip 61 are secured to the ring 57 by suitable means such as screws.

Each section 51 and 53 of the cylinder is made up in the same way, and the construction of the present embodiment is as follows:

A plurality of relatively thin metal sheets 65 are arranged edge to edge. The sheets 65 are preferably formed from a metal having a high degree of resiliency and strength, and also a high degree of flexibility. The strips or sheets 65 are secured together in their end to end arrangement by interior circumferential strips 67 of rubber preferably reinforced with fabric. The strips 67 are secured to the metal sheets 65 by cement and/or lock seams and additional rubber strips (not shown). In this way a cylinder is formed which has circumferential areas which are relatively good heat conductors, and adjacent circumferential areas which are relatively poor heat conductors.

The ends of the portions 51 and 53 of the cylinder 21 are provided with rubber aprons 69 which are secured to the rings 55 and to the center ring 57, whereby the sections 51 and 53 are supported. The rubber reinforced strips 67 and the end aprons 69 are of substantial thickness for the dual purpose of providing heat insulation substantially to prevent formation of frozen liquid at the edges of the metal sheets 65, and to provide tracks for rollers 117 and 123 which serve to guide and deflect the surface of the cylinder as will be hereinafter described.

As hereinbefore pointed out, the cylinder 21 is filled with a refrigerant which is introduced and removed by the shaft 35. In order to prevent the low temperature of the refrigerant from affecting the bearings 17 through the head plates 33, and to prevent the flow of heat from the exterior of the cylinder into the refrigerant through the heads 33, layers of reinforced rubber 34 are provided at the ends of the cylinder 21 adjacent the plates 33, as shown in Figure 1.

The cylinder 21 is conveniently driven by gears 75 which are mounted on the support rings 55 and 57 (Figure 1). These gears 75 mesh with the pinions 77 which are mounted on a drive shaft 79 which extends into the housing 7 as shown in Figures 1 and 2. The drive shaft 79 is suitably supported in bearings 81, and is driven through suitable gearing by a motor 83 (Figure 3).

*Refrigerant circulating mechanism*

The outer surface of the cylinder 21 is preferably kept at the desired low temperature by circulating a refrigerant, which for example may be brine or the like, in the interior of the cylinder 21. One method of circulating the refrigerant or brine is shown in Figures 1, 2 and 3, and comprises forcing pre-cooled brine from a system (not shown) through a strainer 86, into an inlet 85 in the head 48, to which is connected an inlet pipe 87 disposed inside the hollow shaft 35 and substantially concentric therewith. Referring to Figure 2 distributing pipes or nipples 89, 91 and 93 (pipes 89 and 91 being shown in dotted lines) extend from the inlet pipe 87. The pipes 89 and 91 preferably extend upwardly from the pipe 87, and are positioned relatively near the right end of the cylinder 21. The pipe 93 extends downwardly from the pipe 87, and is disposed near the left end of the cylinder. These pipes 89, 91 and 93 connect with header pipes 95 which extend the entire length of the cylinder 21, and which have perforations or nozzles 97 suitably arranged therealong to direct jets of the pre-cooled brine, coming in under pressure in the pipe 87, onto the inner surface of the cylinder 21 (see Figure 2). The header pipes 95 are closed at their ends, and thus all liquid flowing through them passes out of the various nozzles 97. The nozzles are preferably arranged to direct most effectively the jets onto the surface of the cylinder to obtain the most efficient distribution of the pre-cooled brine over the surface of the cylinder. This insures the best possible flow of heat through the walls of the cylinder.

The brine which has thus been forced into the cylinder 21 flows out of the cylinder 21 through openings 99, disposed at intervals along the shaft 35, whereby the spent brine enters the annular space 100 between the shaft 35 and the inlet pipe 87 and flows out through an outlet 101 in the head casting 46. The outlet 101 connects with a return pipe 103 which returns the brine to the brine cooling system. The same pressure which forces the brine into the cylinder 21 also forces the brine into the holes or openings 99, into the annular space 100, and out into the return pipe 103 (Figure 1).

The brine cooling system may be of any known type. A storage tank 102 is provided to take care of any change in volume of the brine system. A further description of it is not deemed necessary herein.

As shown in Figures 1 and 2, means comprising small pipes 105 and 107 having manually controlled valves therein extend to the bottom and the top of the cylinder 21 respectively to facilitate emptying and filling of the cylinder 21. Thus if the cylinder 21 is empty and it is desired to fill the cylinder with brine or the like, the valve of the pipe line 107 is opened, and as the brine flows in, the air in the cylinder is forced out through the pipe 107. If it is desired to drain the cylinder the valve in the line 105 is opened and the liquid in the cylinder 21 is drawn off from the bottom of the cylinder.

*Apparatus for applying the liquid to be frozen to the surface of the cylinder 21*

One of the features of the present invention, is the manner in which the liquid to be frozen is applied to the freezing surface. I have found that by spraying the liquid to be frozen onto the freezing surface I can accomplish many new results, among which are (a) substantially instantaneous freezing of the liquid solution as it contacts with the freezing surface; (b) a completely dry frozen product; and (c) a substantial reduction in the amount of liquid which is necessarily in contact with the cylinder 21 at any given time.

This is accomplished in the present invention by directing the liquid solution to be frozen in fine jets or in a spray onto the revolving freezing surface 22. By thus applying the liquid to be frozen in small amounts to the freezing surface 22, the amount of heat required to be removed from the small amounts in order to reduce the liquid to a temperature below its freezing point, is relatively small, and hence the liquid thus subjected to the cold surface is substantially instantaneously frozen.

Referring to Figures 1 and 2, the supply of liquid A to be frozen is kept in a tank such as is diagrammatically shown at 109.

A pipe 111 is connected to the tank 109 and runs the entire length of the cylinder 21 and is disposed in relation to the cylinder 21 about midway between its top and middle sections, as shown in Figure 2. The pipe 111 has nozzles 113 for projecting either jets or a fine spray of the liquid A against the surface 22 of the cylinder 21. In this way only a relatively small amount of the liquid to be frozen contacts with the surface 22 at one time, and the result is a substantially instantaneous freezing of the liquid as it strikes the surface 22.

The pressure of the liquid in the pipe 111 may be a hydrostatic pressure from the tank 109 or it may receive pressure from a pump or the like. As shown in Figures 1 and 2 a valve 115 is provided in the line 111 to control the flow of liquid through the nozzles 113.

The positioning of the pipe 111 with respect to the cylinder 21 may be varied, whereby the length of time that the frozen liquid remains in contact with the cylinder 21 is also varied. However, by positioning the pipe 111 as shown in Figure 1, the frozen liquid remains in contact with the cylinder 21 for substantially a complete rotation of the cylinder 21 and hence the temperature of the frozen product may be reduced considerably below the melting point of the product.

A number of pipes 111 may be positioned across the cylinder 21, whereby the liquid A is applied to the cylinder at a number of different areas. In this way thicker strips of frozen product B may be obtained.

The thickness of the film may be controlled by different factors among which are (a) the rate of rotation of the cylinder; (b) the rate of flow of the liquid solution onto the cylinder; and (c) the temperature of the surface 22. Further, by controlling the temperature of the surface 22, the rate of cooling of the liquid A in contact with the surface 22 may be controlled.

As hereinbefore pointed out it is desirable in many cases to cool solutions to a temperature below their freezing point, very rapidly, whereby the solution is frozen solid before there is any opportunity for any separation of the liquid or solid in solution from the solvent.

With my improved method of applying the liquid to be frozen to the freezing surface, I can freeze liquid foods such as fruit juices, milk and the like, and I can also freeze solutions having eutectic points, and obtain a substantially homogeneous frozen solution, in which the constituents are in substantially the same proportion as they existed in the liquid solution. Another advantage of the product which I thus obtain is that it is completely dry, and is more or less super-cooled whereby it may be stored in bins or the like until packed for shipment without freezing together in a single solid mass.

Thus with my improved method I obtain a new frozen product, for example a frozen liquid food such as a frozen liquid fruit juice, the properties of which are identical with the properties of the liquid solution, except that they are in a solid state. Further, the constituents are in the same proportion in the solid state as they were in the liquid state. Among the many advantages and uses for such a frozen product which are immediately apparent is the distributing of frozen fruit juice, which may be made into cold beverages by simply mixing proper amounts of the frozen juice and water.

This frozen fruit juice product also may be thawed and used without any dilution with another liquid. In either case the taste of the thawed fruit juice is substantially the same as the taste of the original fruit juice before freezing. Such a frozen product is new. The present commercial methods and means for freezing fruit juices do not produce a thawed fruit juice which tastes the same as the original fruit juice tasted before freezing.

It is to be understood that my invention provides an improved method of cooling and freezing any liquid and is not limited to the cooling and freezing of solutions.

It is to be noted that when fruit juices are frozen with this method, there is obtained a product made up of thin flakes which cling together to the extent that the flakes peel off from the cylinder as a sheet, but are later separable. The flakes may then be packed in such a way as to preserve their surfaces, but when they are later separated and used for making a fruit juice beverage, the large extent of surface which is presented to the liquid in which the flakes are dissolved gives a rapid thawing effect so that the flakes are quickly melted and dissolved in the solution.

With this improved method I can also freeze liquid without employing a large amount of the liquid in the process, and without cooling the liquid until presented to the freezing surface.

*Mechanism for deflecting the cylinder and for guiding the frozen product therefrom*

It is clear from the foregoing description that as the cylinder rotates past the jets of brine on the one side and liquid solution on the other side, a layer or film of the frozen liquid continuously forms on the metal sheets of the cylinder 21. This frozen solid formation clings to the metal surface of the cylinder with great tenacity so long as the cylinder retains its normal cylindrical shape, but is readily removed if the cylinder is sufficiently deflected from its normal shape. It has been found most desirable to peel the frozen substance from the top of the cylinder 21 because of the ease with which the frozen substance thus peeled may be removed from the machine. Thus it is advantageous to deflect the cylinder at its top portion. The deflecting mechanism is designed to remain in constant deflecting position at the top of the cylinder so that as the cylinder rotates a substantially continuous peeling of the product from the cylinder will occur at that point and the product will be peeled therefrom in ribbon-like strips which will pass down a chute 10 into a storage bin (not shown).

The description of the mechanism of the present embodiment is as follows:

As shown in Figures 1, 2 and 5, two relatively large cylindrical guide rollers 117 are provided for each half section of the cylinder, one on each side of central shaft and equidistant therefrom. The rollers 117 are located to contact with the interior rubber strips 67 of the cylinder and maintain a normal curvature of the cylinder at the point of contact. Additional rollers 117 may be provided but it has been found in practice that two large rollers located as shown in Figure 5 are sufficient to guide the rotating cylinder and prevent any deflection which would cause the frozen product to cross-crack or peel. The rollers 117 rotate on shafts journaled in suitable bearings carried respectively by end plates 119 and central plates 121, (see Figures 1 and 5) which are non-rotatably supported on shaft 35 and braced by braces 120. A deflecting roller 123 is located in each half section of the cylinder at the top of the cylinder a distance from the central shaft sufficiently great to raise and deflect the cylinder at that point, i. e., the point of contact between the rollers 123 and the strips 67 of the cylinder may be a greater distance from the axis of rotation of the cylinder than are the points of contact between the rollers 117 and the strips 67 of the cylinder. Rollers 123 rotate on shafts journaled in suitable bearings carried respectively by the end plates 119 and the central plates 121 supported by the shaft 35. The deflecting rollers 123 are considerably smaller in diameter than the guide rollers 117, for the purpose of increasing the deflecting curvature of the cylinder at the point of contact with the smaller rollers 123. Thus, as clearly shown in Figure 2, the frozen solution designated B, which has been frozen in the shape of the normal curvature of the cylinder, will peel off at the point adjacent the roller 123 as the cylinder rotates.

To assist in guiding the frozen product B after peeling from the cylinder, a curved plate 125 having a tapered edge may be secured to the chute 10 adjacent the opening 11 so that the strips of peeled frozen solution may ride out upon and over the plate onto the chute 10.

The degree of deflection of the cylinder 21 may be controlled by changing the position of the roller 123 or by increasing the deflecting effect of the roller 123 by weighting the cylinder 21 as for example by filling the cylinder 21 with the refrigerant.

Another feature of the invention is the provision of an inert gas in the annular space 8 between the insulation housing 7 and the cylinder 21. Such a provision becomes distinctly advantageous when certain substances are to be frozen which in a liquid state are subject to the action of active gases such as oxygen or the like. For example, orange juice when exposed to the air changes its chemical composition rather rapidly, which change is more or less harmful to some of the qualities of the juice. Thus if an inert gas such as carbon dioxide, nitrogen or the like is provided as an atmosphere for the liquid juice it does not change its chemical composition. After the juice is frozen, however, it is not necessary to provide an inert atmosphere because of the reduced tendency of the juices to change their chemical composition after freezing.

In the present embodiment the inert atmosphere is maintained as follows:

A pipe line 135 is disposed adjacent the cylinder 21, and as shown in Figure 2 is above the pipe 111. The pipe 135 is provided with nozzles 137, and is connected to a supply of inert gas such as nitrogen, carbon dioxide, or the like. The nozzles 137 direct the inert gas in the direction of the cylinder and of the pipe 111 so that the inert atmosphere completely immerses the liquid flow from the pipe 111. Extending down from the top of the housing 7 is a baffle plate 139 as shown in Figure 2. The plate extends almost to the top of the cylinder 21. The baffle plate 139 may be formed from a metal, or may be formed from rubber or other flexible resilient material. In the latter case the plate may drag on the rotating surface of the cylinder 21.

Extending from the ends of the chute 10 to the cylinder are sides 141 which are similar to the baffle plate 139. The plate and sides seal off the opening 11 from the annular space 8, and thus a pressure of the inert gas may be maintained in the annular space, without the requirement for an appreciable flow of the gas through the annular space.

As various embodiments might be made of this invention, and as various changes might be made in the construction herein described, all without departing from the scope of the invention, it is to be understood that all matter herein set forth or shown in the accompanying drawings is to be interpreted as illustrative and not in a limiting sense.

I claim:

1. In apparatus of the class described, in combination, a freezing surface comprising a rotating flexible cylindrical surface, means for spraying a liquid onto the outside of said rotating cylindrical surface as it passes a predetermined line, whereby said liquid is substantially instantaneously cooled to a temperature below its freezing point, means for deflecting said rotating surface uniformly across its entire width as it passes another predetermined line, whereby said frozen liquid is removed from said surface at said latter point in long strips, and means to supply a refrigerating medium inside said freezing cylinder to cool said freezing surface.

2. In apparatus of the class described, in combination, a rotating cylinder, means for circulating a refrigerant through the cylinder, means for continuously applying a liquid to be frozen over a relatively narrow area across the width of the surface of said cylinder as said surface moves past said means, whereby said liquid coming in contact with said surface is frozen onto said surface, and means for deflecting said rotating cylinder to remove the frozen solid therefrom in long strips.

3. The method of manufacturing a frozen liquid which consists in continuously spraying a liquid onto a plurality of relatively narrow, parallel, rotating, flexible freezing surfaces to congeal the liquid instantly on the freezing surfaces and continuously deflecting the flexible freezing surfaces to cause the product sprayed thereon to peel off in continuous relatively narrow strips.

4. In apparatus for quick freezing of perishable or eutectic solutions, in combination, a rotating flexible freezing surface, means for applying a uniform film of the solution to be frozen to said rotating freezing surface in limited amounts, the said solution thus applied being substantially instantaneously cooled from a temperature considerably above its freezing point to a temperature below its freezing point whereby the said solution solidifies in a homogeneous mass, the constituents of which are in the same proportion as in the solution before its application to the freezing surface, and means for deflecting said freezing surface at a point over 180° removed from the first point of application of said solution to said freezing surface to cause the solidified solution to peel therefrom in thin strips.

5. In apparatus for the quick freezing of solutions, in combination, a flexible approximately cylindrical rotatable freezing surface, means for causing said surface to travel about a closed path, supply means for continuously applying a liquid film of a liquid solution to be frozen over a relatively narrow area across the width of the said surface and in limited amount as the surface moves past said supply means, whereby the solution of the film is substantially instantaneously chilled from a temperature considerably above its freezing point to a temperature below the freezing point and is thereby solidified in a homogeneous mass, constituents of the solidified solution being in substantially the same proportion as in the solution to be frozen, and means for deflecting said freezing surface at a point removed more than 180° from said supply means to cause the solidified film mass to peel therefrom.

6. The method of manufacturing a frozen liquid solution which comprises the steps of continuously supplying the liquid solution, maintained at a temperature favorable to the continued solution of all of its constituents, in limited amount and in the form of a film to a plurality of parallel traveling endless flexible freezing surfaces, of instantaneously chilling the liquid films to the freezing point of the solution and solidifying the same, whereby the solidified product is homogeneous throughout and its constituents are in the same proportion as in the solution to be frozen, and of continuously deflecting the endless flexible freezing surface at a point removed from the point of application of the solution to the surface to cause the frozen solution to peel therefrom in thin strips.

CROSBY FIELD.